United States Patent Office

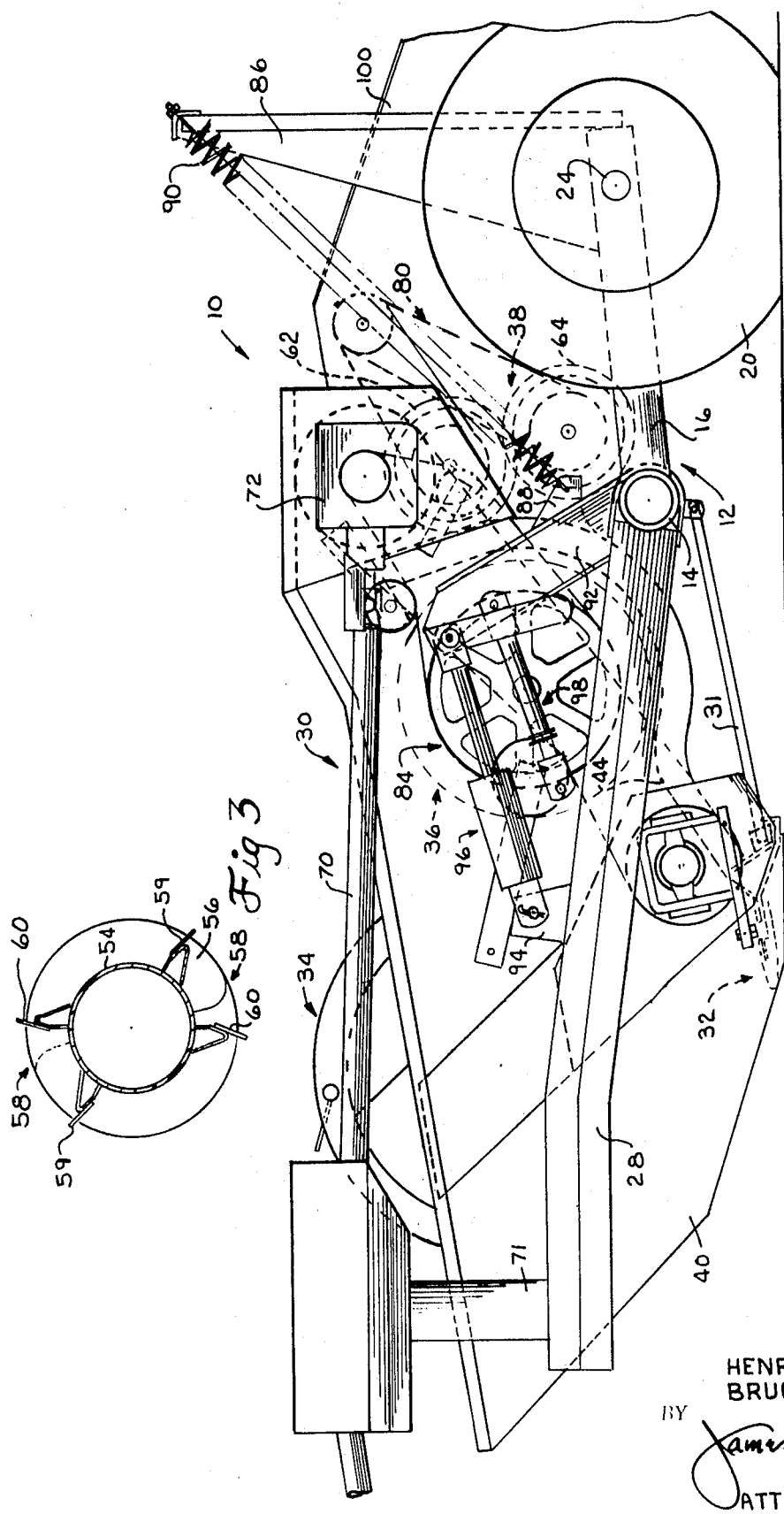

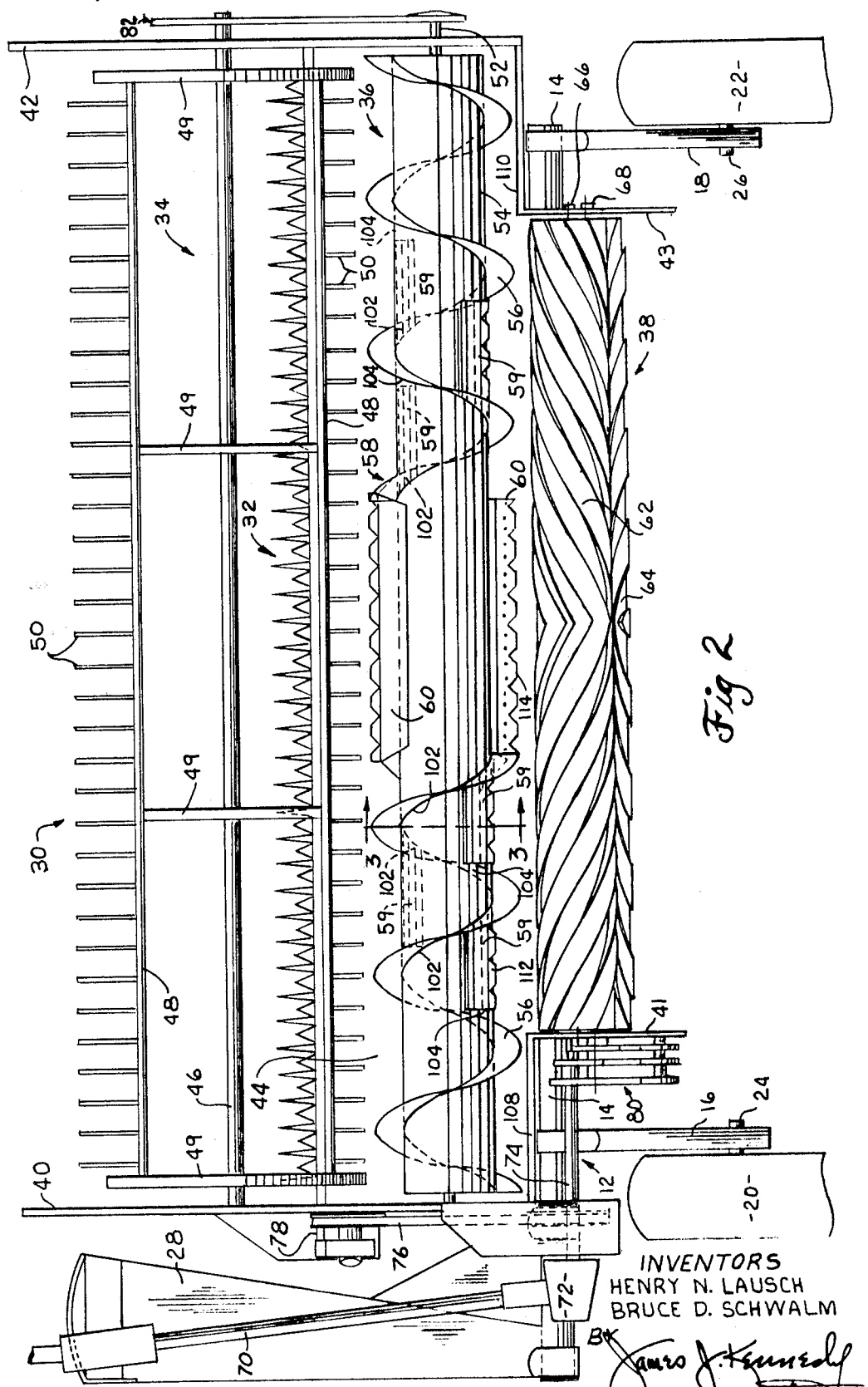

3,624,987
Patented Dec. 7, 1971

3,624,987
HAY CUTTING AND CONDITIONING MACHINE
Henry N. Lausch and Bruce D. Schwalm, Leola, Pa.,
assignors to Sperry Rand Corporation, New Holland, Pa.
Filed Oct. 6, 1969, Ser. No. 864,062
Int. Cl. A01d 43/10
U.S. Cl. 56—1                              8 Claims

ABSTRACT OF THE DISCLOSURE

An agricultural machine for cutting a wide swath of crop material, conveying it rearwardly, consolidating the outer portions of the swath with an auger having a pair of flight sections and a plurality of crop deflecting means disposed thereon which are cooperable to direct the crop material laterally and rearwardly to form a narrower, but uniformly thick mat of crop material for delivery to a pair of crop conditioning rolls disposed between the auger and having a length substantially longer than the space formed between the auger flight sections. The swath of crop material that is discharged on the ground after passing through the conditioning rolls has a width at least as great as a major portion of the width of the originally cut swath.

BACKGROUND OF THE INVENTION

With present hay conditioning machines, the crop material is passed between rolls as wide a swath as that cut by the mower. Generally, the mat of material passing between the rolls is of uniform thickness from end to end. In such condition, a most effective conditioning action is achieved. In crop machines commonly known as windrowers, a given swath of material is cut and this material is delivered to a conveyor such as an auger or slatted belt. Such conveyor laterally consolidates the crop material into a narrower mass and discharges the material into the conditioning rolls. The width of the material when it is discharged to the rolls approximates the width of the windrow to be formed from the ground. With windrowers, very wide swaths of material may be cut, often more than double the width of the swaths handled by hay conditioners. However, because of the large narrow volume of material the conditioning action of windrowers is not as good as conventional conditioning machines.

Wide windrower headers increase harvesting speed because the wider the header the fewer the number of trips that have to be made around the field. For example, a 14 foot windrower has to travel around a field half as many times as a 7 foot mower. Because of the support frame, a cutting mechanism 14′ long or over is possible on the windrower; but such a length would not be feasible for a conventional reciprocating mower supported at one end only. In regard to hay conditioners, it is also feasible to attempt to handle swath as wide as those handled by windrowers. To operate properly, the conditioning rolls must rotate in a close relation to each other and at a closely held spacing. Cost of manufacturing problems increase greatly after a length exceeds certain limits. Therefore, conventionally, hay conditioners are designed to handle the swath cut by a conventional reciprocating mower.

In many areas of the country it is not possible to cut a wide swath of material, consolidate it and then condition it with subsequent discharge in a windrow because the prevailing rates of moisture in the air are such that the windrow can not be dried quickly enough to permit baling. In order to insure proper drying of the cut and conditioned crop material, it is necessary to redeposit the material in a swath either as wide as or substantially as wide as the swath of which was cut by the machine's cutting mechanism. Attempts have been made to construct a swather which would be able to cut a relatively wide swath of crop material, to condition it and deposit it in a swath all in a single operation. Heretofore, however, many difficulties have been encountered. One of the biggest problems has been that as the length of the conditioning rolls approach the length of the cutting mechanism, generally a minimum of 12 feet in a swath machine, it becomes increasingly more difficult to support the rolls because of their tremendous weight and to still control an operable machine. When a pair of intermeshing, highly aggressive rubber rolls are used, the problem becomes even more pronounced since it is very difficult to retain a uniform intermeshing fit between the rolls over a very long distance. Therefore, it has been found necessary to use rolls in such machines which are shorter in length than the length of a cutting mechanism.

Because the length of the rolls are shortened somewhat over the length of the cutter bar and because it is desirable to keep the swath material deposited on the ground after passing through the conditioning rolls as wide as possible, it is necessary to make the rolls as long as possible while still being able to retain alignment and support considerations. Therefore, in order to direct the relatively wide swath cut by the cutting mechanism through the narrower conditioning rolls it is necessary to provide an auger between the cutter bar and the conditioning rolls which will consolidate the outer portion of the swath and then distribute the outwardly consolidated portions in a uniform manner across the bite formed between the two intermeshing rolls. The resulting swath passing from the conditioning rolls will only be as good as the swath of material fed to the rolls. It is extremely important that the consolidated material be evenly distributed across the bite of the rolls so there are not great wads of material or great bunches of material at the outside edges of the swath but rather, the swath is provided with a relatively uniform thickness to permit even drying.

SUMMARY OF THE INVENTION

The present invention relates to an agricultural machine and more particularly to an improvement machine for cutting and handling a swath of crop material.

The present machine is a swathing machine cutting a relatively wide swath of material which is provided with a pair of conditioning rolls which crushes and cracks the stems of crop material as they pass through the rolls to assure faster drying after the material is deposited on the ground. The conditioning provides for more speedy reduction of crop moisture whereby the material may be baled and removed from the field. Shortening the harvest time lessens the danger of crop losses from rain or other causes.

By the present invention it is now possible to cut a relatively wide swath of crop material such as that cut by a wide windrow header, to condition the material in a relatively wide swath, but narrower than that originally cut and to deposit the conditioned swath on the ground so that the resulting swath is substantially wider than that formed by a windrowing machine but narrower than the swath originally cut by the machine.

The primary object of this invention is to provide a machine which can handle a wide swath of a size cut by a windrower, but which will condition crop material in a manner similar to that of a conventional hay conditioning machine.

Another object of this invention is to provide a machine of the character described which will more smoothly and more effectively cut a wide swath of crop material conditioned for deposit on the ground.

A further object of this invention is to provide a unitary machine of the character described wherein ground wheels travel within the path cut by the machine wherein the wheels are positioned directly alongside the conditioning means behind the header unit whereby good gaging and responsiveness of the machine is obtained relative to the ground conditions.

A still further object of this invention is to provide a consolidating means forwardly of the conditioning rolls which will consolidate the outer portions only of the cut swath into a narrower swath having a relatively uniform cross sectional thickness as the swath is fed into the conditioning rolls.

Other objects of this invention will be apparent hereinafter from the specification and from the recital in the appended claims.

BRIEF DESCRIPTION OF THE DRAWINGS

FIG. 1 is a side elevation of a harvesting machine constructed in accordance with the present invention;

FIG. 2 is a plan view of FIG. 1; and

FIG. 3 is a cross sectional view taken along the line 3—3 shown in FIG. 2.

DESCRIPTION OF THE PREFERRED EMBODIMENT

Referring now to the drawings by numerals of reference, 10 generally denotes a hay cutting and conditioning machine constructed in accordance with the present invention. The machine 10 is comprised of a frame structure 12 having a longitudinally extending rockshaft 14 and a pair of rearward radially extending reel arms 16, 18 to which support, ground engaging wheels 20 and 22 are fixed by means of stud shafts 24, 26.

A draft frame 28 is pivotally mounted by one end to rockshaft 14 and extends forwardly thereof to be connected to the rear end of a suitable towing vehicle, not shown.

A subframe 30 is pivotally mounted on rockshaft 14 by means of a link 31 which extends between the rockshaft and the subframe, as shown in FIG. 1. The subframe 30 carries a plurality of crop treating elements including a sickle means 32 which is located at the forward end of the subframe adjacent the ground, a reel 34 rotatably supported above the sickle means 32, an auger means 36 rotatably mounted rearwardly of the reel and sickle means, and a pair of crop conditioning rolls 38 disclosed in close proximity to the auger means. Side sheets 40, 42 form the side portions and supporting members of subframe 30. A floor portion 44, shown in FIGS. 1 and 2, extends from the rear edge of the sickle means 32 upwardly to and under auger means 36.

Reel 34 is comprised of a central shaft portion 46 which is rotatably supported in side sheets 40 and 42, as shown in FIG. 2, and extends horizontally therebetween. A plurality of tine bars 48 are suitably pivotally supported on a plurality of spaced apart spiders 49 and a plurality of tines 50 are fixed by suitable means, not shown, to tine bars 48, extending outwardly therefrom.

Auger means 36 is comprised of a supporting shaft 52 which is rotatably supported in side sheets 40 and 42, a tubular portion 54 which extends from side to side of the subframe 30, a pair of auger flight sections 56, and deflector means 58.

The crop conditioning rolls 38 are comprised of an upper roll 62 and a lower roll 64 which are rotatably supported by shafts 66 and 68, respectively, which are suitably mounted in side sheets 41 and 43, as shown in FIG. 2. Each of the rolls is provided with a plurality of raised rib portions spiraled over the surface thereof forming a chevron roll design. The relationship between the rolls is such that the chevron patterns of each roll intermesh forming an extremely aggressive roll. As can be seen in FIG. 1, the upper roll 62, is mounted in parallel relation to the lower roll 64, but forwardly of the lower roll 64 so that a downwardly facing bite is formed between the intermeshing rolls.

A PTO input shaft 70 is suitably supported by a stanchion 41 having its lower end fixed to the draft frame 48, as shown in FIGS. 1 and 2. The rear end of PTO shaft 70 terminates in a gearbox 72 which functions to transfer the input drive to an output shaft 74. A belt 76 is suitably driven between the output shaft 74 and sickle drive 78 by conventional means, not shown. Similarly, the roll drive train designated by numeral 80 and the auger drive 84 are suitably driven from the power output shaft. The reel 34 is driven from the auger by means of a drive mechanism 82. This drive mechanism 82 may be either a belt or a chain drive system, both of which are well known in the art.

Disposed rearwardly of the frame means 12 is an upright frame member 86 which is fixed by its lower end to the outer portion of wheel arms 16, 18, as shown in FIG. 1. A tab 88 extends rearwardly from each side of subframe 30, as shown in FIG. 1, and a resilient supporting means, or spring 90, extends between the upstanding frame 86 and the tab 88 to resiliently support the subframe relative to the main frame and to permit the subframe to follow, or float, relative to the contour of the ground as the machine travels through a field.

A lever arm 92 is fixed by its lowermost end to rockshaft 14 and extends radially outwardly therefrom, as shown in FIG. 1. A bracket 94 is fixed intermediate the ends of draft frame member 28 and hydraulic actuating means 96 is suitably secured to the tab and extends rearwardly to the outward end of lever arm 92. A telescopic link means 98 also extends between lever arm 92 and subframe 30 to keep the distance therebetween fixed.

Turning now to a detailed description of the auger means 36, and referring generally to FIGS. 2 and 3, it can be seen that the deflector means 58 comprise first and second deflector paddle members which are axially and circumferentially spaced about the tubular portion 54. Each of the deflector paddles is fixed by its innermost end to the tubular portion 54 and extends outwardly therefrom. The auger flight sections extend inwardly from the outer ends of the tube portion and are spirally wound therearound extending towards the center of the auger means and terminating in spaced apart relation, as shown in FIG. 2. It can be seen that the auger flighting extends inwardly beyond the ends of the rolls. It is also clearly shown that the rolls 62, 64 are substantially longer than either auger flight section, or the space formed between the space on the auger tube section between the pair of spaced apart auger flight sections. The significance of this relationship will be further described in detail hereinafter.

The first deflector paddle members 59 are relatively short members being disposed on the auger tube portion between flights of the auger flight sections. Each auger flight has a leading and a trailing surface, the leading surface being the working surface, or that surface which actually forces material along, and the trailing edge being the edge which does not normally engage and force crop material along. Each of the paddle members 59 have an end which is in abutting relation with a trailing surface of an auger flight, as denoted by numeral 102, with the other end of the paddle member 59 being spaced from by space 104 from the leading surface of the auger flight. This relation is established to permit crop materials to be acted upon by both the auger flighting and the paddle deflecting members. Material is able to pass from the paddle members directly into the rolls, or material may pass through space 104 and be conveyed further along by the auger means for subsequent discharge into the bite of the rolls. This produces a uniform delivery of crop material from the outer edges of the cut swath to the conditioning rolls, since some of the material will be delivered directly into the rolls by the paddle members 59 which sweep the material rearwardly while other material is permitted to pass by the deflector paddles through the space and to be carried down further toward the center of the rolls where it will be either directed into the bite of the rolls or carried still further toward the center of the rolls by the cooperation of the auger flights and the deflector paddles.

The second deflector members are comprised of a pair of opposed paddle members 60 which are disposed in the space between the auger flight sections and spaced from each other by 180 degrees, as shown in FIG. 2. These paddles function to deflect material delivered to the central portion of the subframe by means of the reel 34.

As can be seen from the drawings, each of the first and second deflecting paddle members is provided with an aggressive outer surface having the form of rooster combs 112 and 114, respectively, or the like. This aggressive surface is necessary to assure that crop material is wiped from the reel tines 50 and delivered to the conditioning rolls.

In operation, the hay cutting and conditioning device, having a 12 or 14 foot header, is pulled through a field of standing crop material by an appropriate tractor device with power being supplied to run the machine from the tractor through the PTO input shaft 70. The input power is then transferred to gearbox 72 and finally to the individual drive mechanisms in a conventional manner as hereinbefore described. In this way, the sickle means 32 is caused to reciprocate back and forth with respect to the subframe cutting the crop material as it passes through the field. The reel 34 which is mounted above the sickle means engages the 12 or 14 foot wide swath of cut crop material with the tine fingers 50 sweeping the material over the sickle means then upwardly and rearwardly over the floor portion 44 to auger means 36. This relatively wide swath of material is then consolidated at the outer ends by the auger flight sections 56 so that the outer portion of the swath is consolidated with the central portions of the cut swath to produce a narrower swath of material, but one which has a width at least as great as a major portion of the width of the first cut swath. As the material is delivered to the auger means, the material is conveyed laterally and rearwardly so that a uniform distribution of material is delivered to the bite of the conditioning rolls. The conditioner rolls 62, 64, which are approximately seven to nine feet in length, are mounted in a discharge opening which is formed between two upright vertical walls 108 and 110, as shown in FIG. 2. The rolls are in close proximity to the auger means and because of a high rotational speed relative to the auger and the aggressiveness of the surface formed by the chevron tread design, the rolls strip material from the auger directing it rearwardly between them where the stems of the crop material are crushed and cracked. As the material leaves the rolls it passes outwardly and downwardly through deflector shields 100 where it is deposited in a relatively wide swath having a relatively uniform cross sectional thickness to permit even drying of the conditioned material.

As shown in FIG. 2, the wheels 20, 22 are on a common axis and they are located directly alongside of the conditioning unit 20 and immediately behind auger sections 56. With this arrangement, the structure is generally symmetrical and the implement is provided with considerable balance and stability. The wheels travel inside of the swath cut by sickle 15 and thus do not overrun the standing material.

With the design described, the conditioning of crop material is substantially superior to that obtained with a windrower because the mat delivered to the conditioner 20 is wider and thinner than that delivered to a windrower conditioning unit. Also, the overall width of the machine can be as great as a conventional windrower, a construction which is not feasible for the conventional conditioner. By maintaining the transverse length of the conditioning unit 20 increasing the lengths of the side auger sections 56, the overall width of the machine can be increased as desired and nevertheless superior conditioning of the crop material will be achieved.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention.

Having thus described our invention, what we claim is:

1. A harvesting device for cutting and conditioning a relatively wide swath of crop material by passing through a field of standing crop, comprising in combination: a wheel supported main frame and a subframe pivotally supported on said main frame, said subframe having crop treating elements thereon comprising a cutting mechanism disposed forwardly of said subframe adjacent the ground and operative to cut a given swath of crop material; a reel rotatively disposed above said cutting mechanism and adapted to engage crop material and sweep it rearwardly over a floor portion; a transversely extending auger spaced rearwardly of said reel and rotatively mounted about its outboard ends to said subframe, said auger including a pair of flight sections extending inwardly from the outboard ends and terminating in spaced apart relationship about a medial portion of the auger, said flight sections being oriented so as to convey the crop material inwardly toward the space therebetween; a discharge opening of less width than said auger but of a width greater than the space between the pair of auger flight sections, said discharge opening being centrally disposed behind said auger with the outer extremities thereof being spaced inwardly of the outboard ends of said auger and outwardly from the medial space between the auger flight sections; a pair of conditioning rolls transversely disposed one above the other in said discharge opening with the upper roll being located forwardly of the lower roll in close proximity to said auger such that the crop material is received from said auger and fed through the conditioning rolls for conditioning; and first and second crop deflecting means mounted on said auger for providing balanced and positive feeding along the entire width of said conditioning rolls, said first deflecting means being disposed about the space between the pair of auger flight sections and said second crop deflecting means comprising a series of deflecting elements laterally spaced intermittently within inboard portions only of each auger flight section extending adjacent the discharge opening, said deflecting elements of said second deflecting means being selectively spaced and particularly oriented to move only a portion of the auger crop complement rearwardly into the conditioning rolls, leaving a portion to be further conveyed inwardly until it is moved rearwardly into the conditioning rolls by another deflecting element disposed within the particular flight or the first set of deflecting means disposed between the auger flightings.

2. A harvesting device, as recited in claim 1, wherein the crop deflecting elements disposed intermittently within each auger flight section are axially spaced about said auger.

3. A harvesting device, as recited in claim 1, wherein the adjacent deflecting elements are axially spaced 180 degrees apart.

4. A harvesting device, as recited in claim 1, wherein said first and second crop deflecting means comprise generally elongated paddle members extending generally in a parallel relationship relative to the axis of rotation of said auger, said paddle members including an outer serrated edge for aggressively engaging the crop material.

5. A harvesting device as recited in claim 4 wherein the first crop deflecting means includes two paddle members axially spaced 180 degrees apart, each of the two paddle members being disposed so as to extend inwardly from the inward end of one of the flight sections.

6. A harvesting device for cutting and conditioning a relatively wide swath of crop material by passing through a field of standing crop, comprising in combination: a wheel supported main frame and a subframe pivotally supported on said main frame, said subframe having crop treating elements thereon comprising a cutting mechanism disposed forwardly of said subframe adjacent the ground and operative to cut a given swath of crop material; a reel rotatively disposed above said cutting mechanism and adapted to engage crop material and sweep it rearwardly over a floor portion; a transversely extending auger spaced rearwardly of said reel and rotatively mounted about its outboard ends to said subframe, said auger having first and second flight sections oppositely disposed thereabout so as to convey crop material inwardly in response to the rotation of said auger; a discharge opening of less width than said auger and centrally disposed therebehind; said discharge opening having outboard ends; a pair of conditioning rolls transversely disposed one above the other in said discharge opening with the upper roll being located forwardly of the lower roll in close proximity to said auger such that the crop material is received from said auger and fed through the conditioning rolls for conditioning; and a series of crop deflecting means laterally spaced intermittently within portions of each auger flight section extending inwardly from and adjacent to said outboard ends of said discharge opening only, said deflecting means being particularly spaced and oriented for providing balanced and positive feeding along the entire width of the conditioning rolls as each of said deflecting means functions to move only a portion of the auger crop complement rearwardly into the conditioning rolls, leaving a portion to be further conveyed inwardly until it is moved rearwardly into the conditioning rolls by other inwardly adjacent deflecting means of said series of deflecting means.

7. A harvesting device, as recited in claim 6, wherein the crop deflecting means disposed intermittently within each auger flight section are axially spaced about said auger.

8. A harvesting device, as recited in claim 6, wherein said crop deflecting means comprise generally elongated paddle members extending generally in a parallel relationship relative to the longitudinal axis of said auger, said paddle members including an outer serrated edge for aggressively engaging the crop material.

References Cited

UNITED STATES PATENTS

| | | | |
|---|---|---|---|
| 3,118,265 | 1/1964 | Shaver | 56—23 |
| 3,139,717 | 7/1964 | Fischer | 56—1 C X |
| 3,224,177 | 12/1965 | Adee | 56—23 |
| 3,324,639 | 6/1967 | Halls et al. | 56—1 C |
| 3,474,602 | 10/1969 | Molzahn | 56—23 |
| 3,509,699 | 5/1970 | Calder | 56—23 |

FOREIGN PATENTS

| | | |
|---|---|---|
| 538,449 | 3/1957 | Canada. |
| 659,698 | 3/1963 | Canada. |

ROBERT PESHOCK, Primary Examiner

J. A. OLIFF, Assistant Examiner